July 31, 1951 C. E. LOMAX 2,562,362

TESTING SYSTEM EMPLOYING TEST DISTRIBUTOR SWITCHES AND TEST CONNECTOR SWITCHES

Filed Nov. 4, 1947 4 Sheets-Sheet 1

FIG. 1 TEST DISTRIBUTOR SELECTOR IN MAIN OFFICE

INVENTOR.
CLARENCE E. LOMAX

BY [signature]

ATTORNEY

July 31, 1951 C. E. LOMAX 2,562,362

TESTING SYSTEM EMPLOYING TEST DISTRIBUTOR SWITCHES
AND TEST CONNECTOR SWITCHES

Filed Nov. 4, 1947 4 Sheets-Sheet 2

TEST DISTRIBUTOR IN MAIN OFFICE

INVENTOR.
CLARENCE E. LOMAX

BY

ATTORNEY

INVENTOR.
CLARENCE E. LOMAX
BY
Chas. W. Candy
ATTORNEY

INVENTOR.
CLARENCE E. LOMAX
BY
ATTORNEY

Patented July 31, 1951 2,562,362

UNITED STATES PATENT OFFICE 2,562,362

TESTING SYSTEM EMPLOYING TEST DISTRIBUTOR SWITCHES AND TEST CONNECTOR SWITCHES

Clarence E. Lomax, Chicago, Ill., assignor to Automatic Electric Laboratories, Inc., Chicago, Ill., a corporation of Delaware Application November 4, 1947, Serial No. 783,962

9 Claims. (Cl. 179—175.2)

The present invention relates in general to automatic telephone systems, and more particularly to circuit facilities employed in such systems for testing subscribers' line circuits from a test switchboard and for verifying the line numbers of subscribers' line circuits from an operator-controlled switchboard which is usually a switchboard for completing toll connections to, and from, the line circuits.

The improved circuit facilities provided by the present invention include a test switchboard located in a main office and equipped with position test circuits having the instruments and other apparatus necessary to perform tests on subscribers' line circuits, a test distributor switch accessible to the test switchboard over one trunk path and operable thereover, test connector switch, or switches, accessible to the test distributor switch and operable from the test switchboard through the test distributor switch for selecting line circuits in the main office for testing, and an operator-controlled switchboard located in the same main office and having access to the same test distributor switch over another trunk path for controlling the test distributor switch and associated test connector switch, or switches, to select certain main office line circuits thereby to verify line numbers passed to the operators by main office subscribers when requesting that certain connections (toll) be established for them.

The improved circuit facilities further include a similar test switchboard located in a branch office, a test distributor switch in the branch office accessible to the branch office test desk, test connector switch, or switches, accessible to the branch office test distributor switch and operable from the branch office test switchboard through the branch office test distributor switch for selecting line circuits in the branch office for testing, and means in the main office for enabling the main office test switchboard and the main office operator-controlled switchboard to respectively make tests on branch office line circuits and verify branch office line numbers over the same branch office test distributor switch and test connector switch, or switches, as used by the branch office test switchboard.

It is an object of the invention to provide in circuit facilities of the character described, new and novel means for accomplishing the various circuit connections.

Another object of the invention is to provide in a testing system of the character described, an improved and novel test distribtuor switch serving both testers and verification operators, which is seized directly by the testers and through a selector switch by the operators, and which is automatically positioned for testing service when seized directly and for verification service when seized through a selector switch.

A further object of the invention is to provide in a testing system of the character described, an improved test distributor switch which incorporates new and novel means for busying a selected test connector switch.

A still further object of the invention is to provide in a testing system of the character described, novel means for artificially busying a test distributor switch while it is in service, said artificial busying causing no interference with the regular operation and release of the testing system.

Another object of the invention is to provide in a testing system of the character described, improved and novel means for releasing an operated test connector switch.

Another object of the invention is to provide an improved multi-office testing system wherein the same test distributor switch in a branch office is available to the main office testers and verification operators as well as to the branch office tester, wherein means is provided for busying the path from the branch office test switchboard to the branch office test distributor switch when the branch office test distributor switch is seized over the path from main office, and wherein means is provided for busying the path from main office when the branch office test distributor switch is seized over the path from the branch office test switchboard.

A feature of the invention resides in the novel arrangement of the pulsing circuit of a 200-line test connector switch having two sets of wipers (one set for each 100-line group) and a minor switch for selecting either set of wipers, whereby the pulsing circuit is first controlled to raise the wipers to a certain level, then controlled to rotate the wipers to a required position in the selected level, next controlled to cause the minor switch to select one set of wipers, and later controlled to further rotate the wipers in the selected level.

Another feature of the invention concerning the 200-line test connector switch is that on a testing connection the wiper selecting minor switch of the test connector switch is not restored to normal position unless both the test distributor switch and the test connector switch of the testing connection are released. A tester is able to release the test connector switch without releasing the test distributor switch, and the consequent non-restoration of the wiper selecting minor switch enables the tester to connect with a line circuit in another level of the same 100-line group by dialing only the vertical and rotary digits of the line number.

A further feature of the invention relates to the novel means for inserting condensers in the testing, or listening, circuit of the test distributor switch when the test distributor switch is seized by a verification operator through a selector switch.

An additional feature of the invention concerns a new and novel use of the vertical off-normal spring set of a test distributor switch for controlling relays associated with the vertical stepping and the release of the test distributor switch.

There are other objects and features of the invention having to do for the most part with the circuit details necessary to carry out the objects and features above enumerated.

The various objects and features of the invention will be understood best from a perusal of the following description of the drawings comprising Figs. 1 to 4 inclusive, which show by means of the usual circuit diagrams a sufficient amount of apparatus to enable the invention to be described and understood.

Fig. 1 also includes a numbering plan for assembling the drawing sheets together so that a continuous circuit drawing of the invention may be established.

Figure 3:
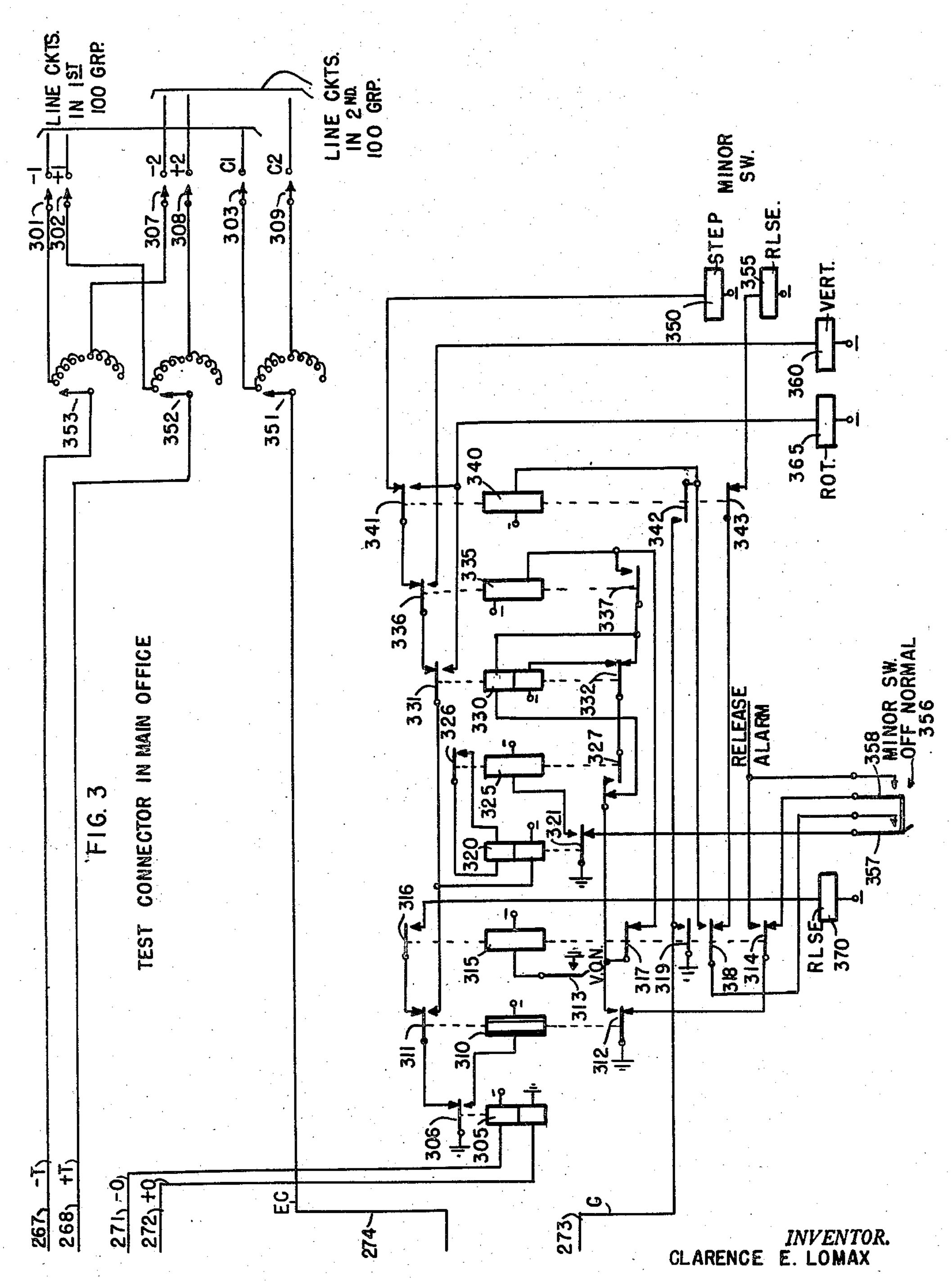
Fig. 3 shows the circuit arrangement of a 200-party line test connector switch fitted with two sets of wipers and a minor switch for selecting either set of wipers.
Figure 4:
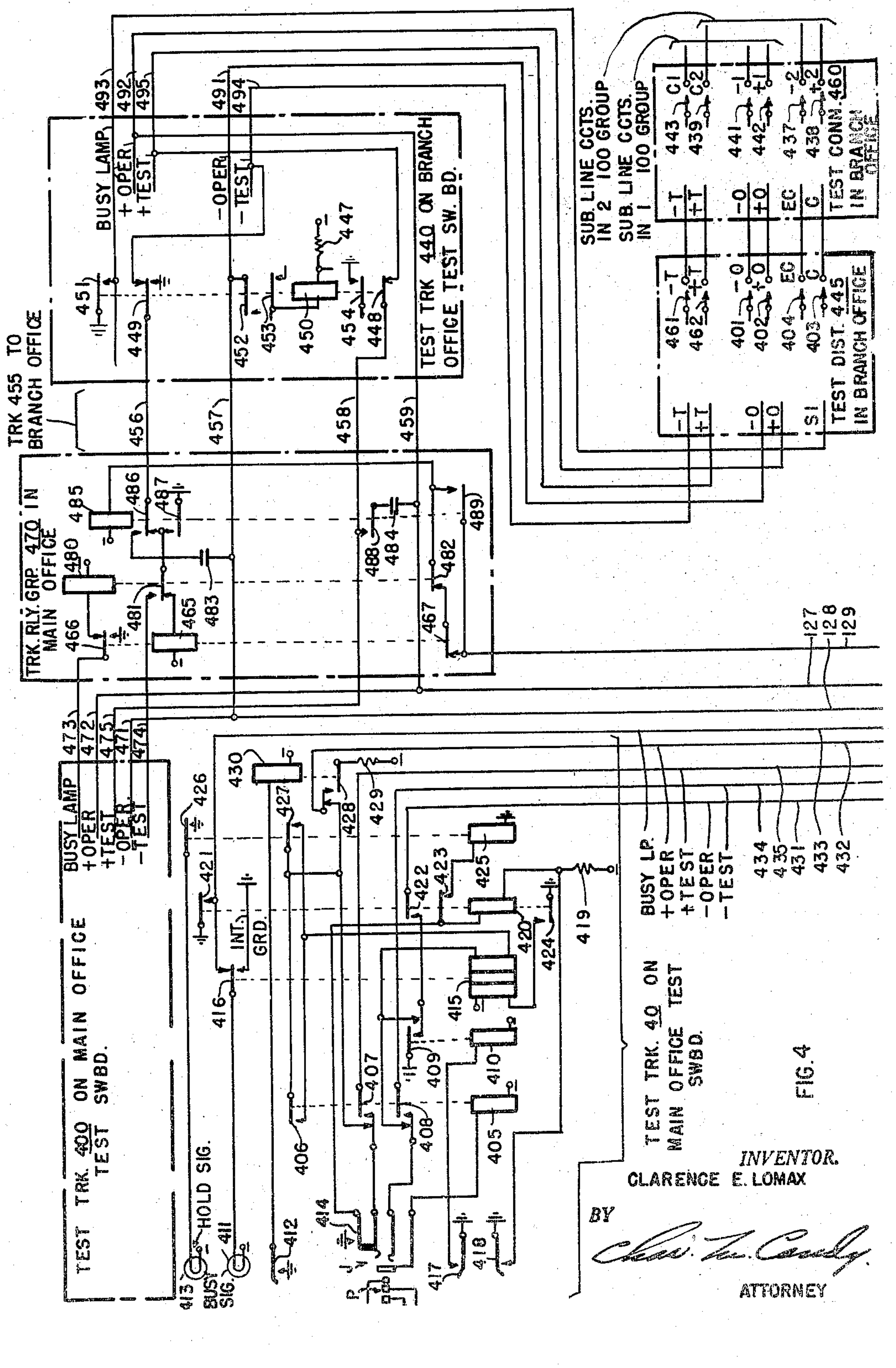

Fig. 4 shows the circuit arrangement of a test trunk on the main office test switchboard, a trunk relay group in the main office, a test trunk on the branch office test switchboard, a test distributor switch in the branch office and a test connector switch in the branch office. The test trunk on the branch office test switchboard is shown mostly in block form as its circuit details are the same as those shown for the test trunk on the main office test switchboard with the differences illustrated. The branch office test distributor switch and test connector switch are shown in block form as their circuit details are respectively the same as those shown in Figs. 2 and 3 for the main office test distributor switch and test connector switch.

The test distributor selector switch (Fig. 1) comprises the well-known Strowger switch mechanism of the 300-point type having vertical and rotary movement. Associated with this Strowger mechanism is a set of switching springs 139 which are actuated by the movement of the switch shaft in the vertical direction away from its normal position and a set of switching springs 119 which are actuated by the movement of the switch shaft into its eleventh rotary position. The test distributor selector switch also includes various control relays, and has access to a maximum of ten groups of ten trunks each.

The test distributor switch (Fig. 2) comprises the well-known Strowger switch mechanism of the 600-point type having vertical and rotary movement. Associated with this Strowger mechanism is a set of switching springs 234 which are actuated by the movement of the switch shaft in the vertical direction away from its normal position, a combined test jack and busy switch 224, condensers 218 and 219, and a number of control relays. The test distributor switch has access to a maximum of 100 test connector switches.

The test connector switch (Fig. 3) comprises the well-known Strowger switch mechanism of the 600-point type having vertical and rotary movement. Associated with this Strowger mechanism is a set of switching springs 313 which are actuated by the movement of the switch shaft in the vertical direction away from its normal position, a 10-point minor switch of a well-known type, and a number of control relays. The regular wipers of the test connector switch are grouped into two groups of three wipers each, one group of wipers for selecting line circuits in a 100-line group and the other group of wipers for selecting line circuits in another 100-line group. The minor switch selects either one of the two sets of regular wipers and comprises a step magnet 350, a release magnet 355, and a set of switching springs 356 which are actuated by the movement of the minor switch shaft in a direction away from its normal position.

The test trunks on the test switchboards (Fig. 4) each comprise a jack for enabling the tester to connect the plug ending position testing circuit with the test trunk, a busy lamp signal, a hold lamp signal, keys for controlling the release of the operated test distributor switch and the test connector switch, and a group of control relays.

Figure 1:
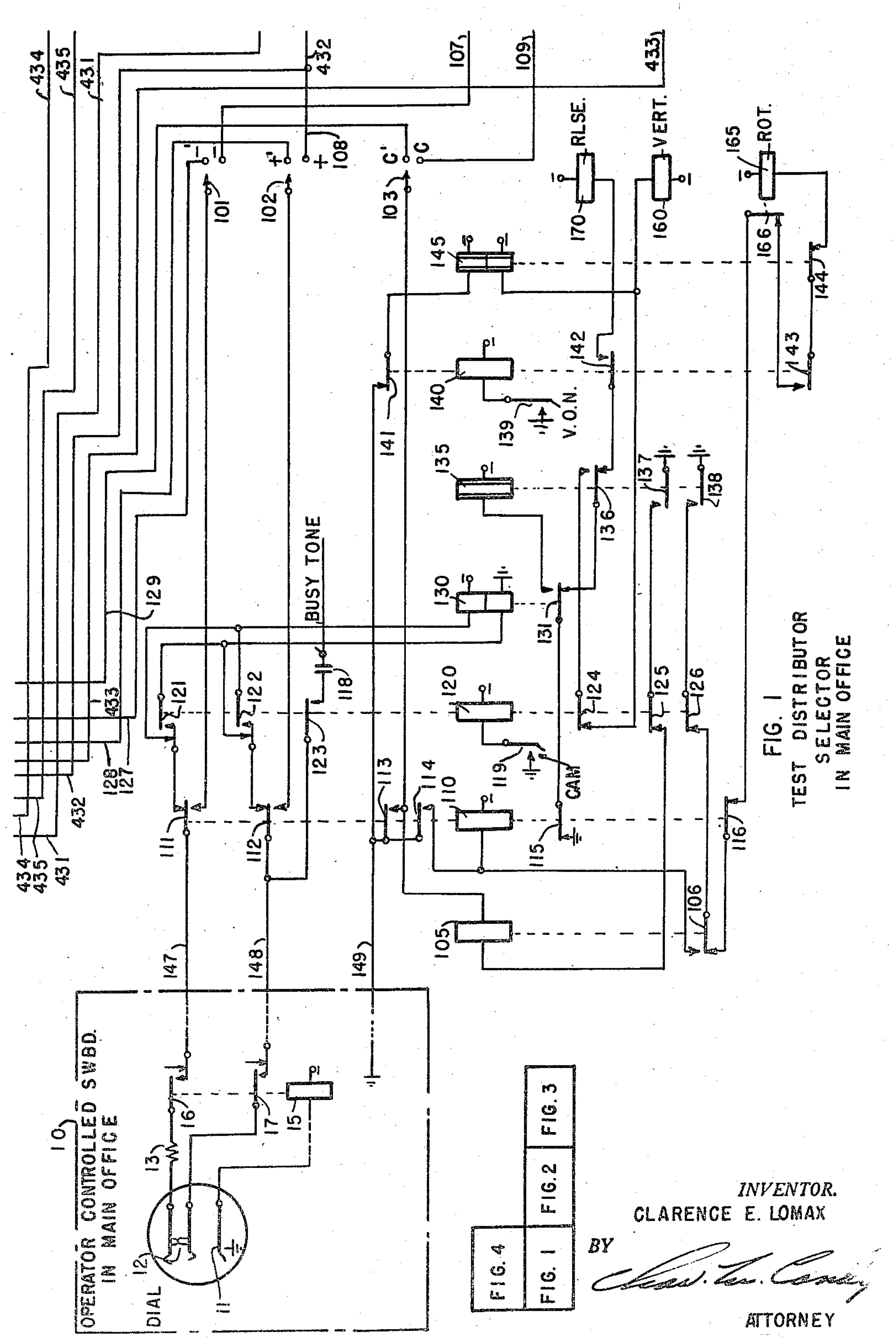
Fig. 1 shows the circuit arrangement of a test distributor selector switch and the basic circuit elements of an associated operator-controlled switchboard.

The position testing circuit for the test switchboards is indicated in Fig. 4 by only the plug P but may be of any well-known design such as that shown in Fig. 1 of the Crocker Patent No. 1,691,269, dated November 13, 1928, the plug P in Fig. 4 of this specification corresponding with plug P' in Fig. 1 of Patent No. 1,691,269.

The main office trunk relay group 470 shown in Fig. 4 comprises a group of control relays and condensers 483 and 484 which are automatically inserted into the test, or talking, conductors when the trunk relay group is seized from the operator-controlled switchboard 10 in the main office. The trunk relay group is connected between test trunk 400 of the main office test switchboard and test trunk 440 of the branch office test switchboard, and is also accessed from the operator-controlled switchboard 10 in the main office over conductors 127, 128 and 129.

It should be understood at this time that while the embodiment of the present invention disclosed and described in this specification includes well-known switches of certain bank capacities, the invention is not limited to the particular form shown but may utilize other bank-capacity switches or other arrangement combinations of the switches.

It should be further understood that while a plurality of battery connections are shown in the drawings for the equipment located in any one office, they are preferably the same battery for that office. Also, in order to simplify the drawings further, such well-known facilities as busy keys, jacks for enabling an attendant to plug into the various switches, spark quenching apparatus, supervisory and release signal arrangements, ringing and tone generating equipment and the like not a part of the present invention, have been omitted.

Having described the equipment and apparatus, a detailed description of the operation will now be given.

*Testing from main office test switchboard to main office lines*

Figure 2:
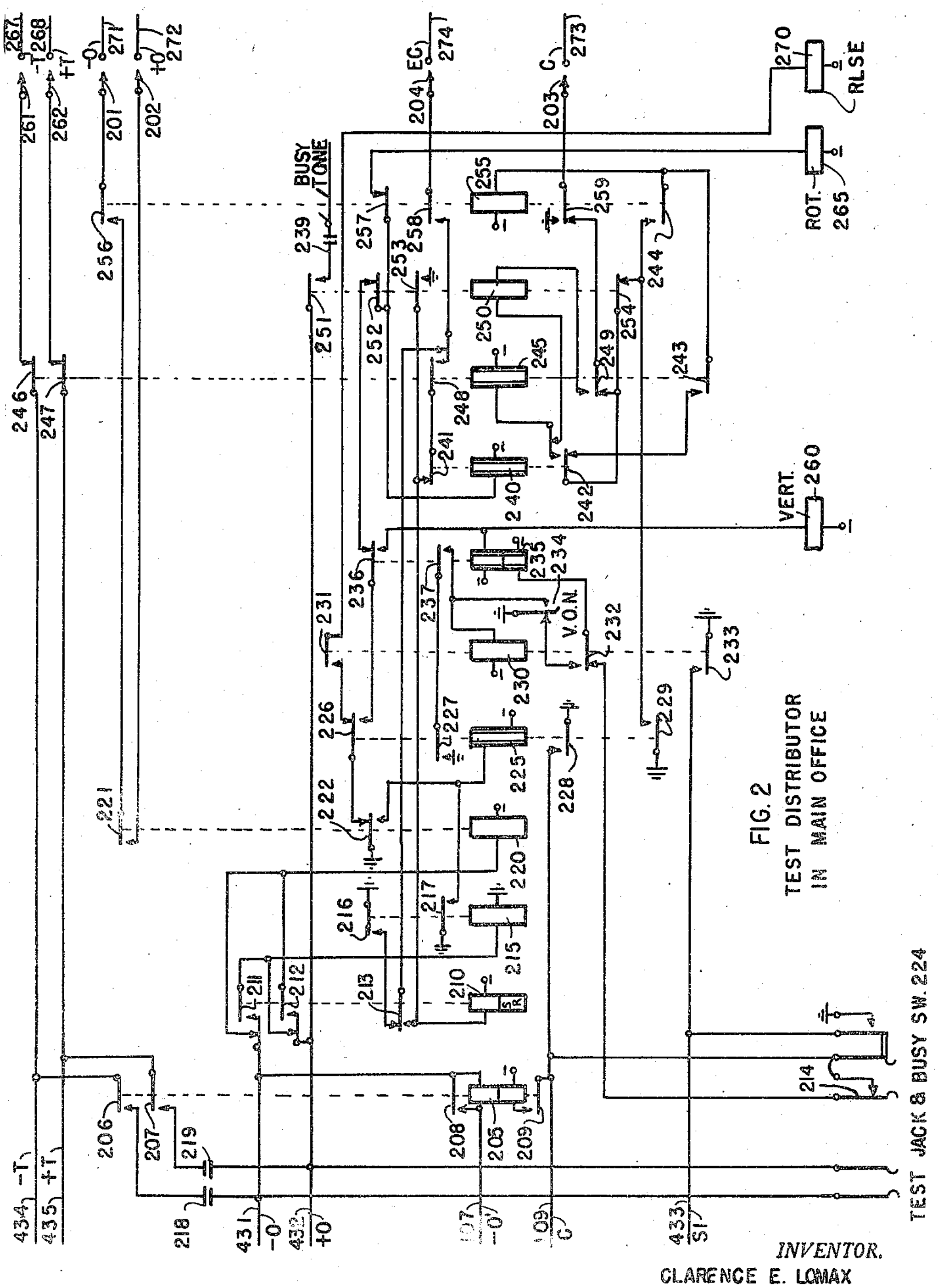
Fig. 2 shows the circuit arrangement of a test distributor switch, the banks of which have access to test connector switches.

Upon noting that busy lamp 411 of test trunk 40 (Fig. 4) leading to the main office test distributor Fig. 2 is dark, thus indicating that test distributor Fig. 2 is not in prior use, tester inserts plug P (Fig. 4) of his position testing circuit into jack J of test trunk 40. Relay 405 accordingly operates from ground on the sleeve conductor of plug P, sleeve conductor of jack J, winding of relay 405 to battery, and relay 420 operates from ground, contact 414 of jack J, winding of relay 420, resistor 419 to battery.

The operation of relays 405 and 420 connect a winding of relay 415 across the "−" and "+" operate-leads of test distributor Fig. 2 to seize the test distributor and cause the operation of relays 215 and 220 in the test distributor. This seizure circuit may be traced from ground, winding of relay 215 (Fig. 2), resting contact of armature 212, conductor 432 to Fig. 4, resting contact of armature 423, armature 406, right-hand winding of relay 415, resting contact of armature 409, armature 422, conductor 431 to Fig. 2, resting contact of armature 211, winding of relay 220 to battery. At armature 424, relay 420 completes a circuit to the left-hand winding of relay 415 to battery, but the two windings of relay 415 are now so poled that relay 415 does not operate. At armature 421, relay 420 completes a circuit to busy lamp 411 but the tester ignores this busy signal at this time because he knows that he caused its operation. The operation of relays 215 and 220 complete obvious multiple circuits to relay 225 which in turn places ground potential on conductor 109 to make test distributor Fig. 2 busy on the related C bank contact of the test distributor selector switch in Fig. 1. At armature 228, relay 225 completes a circuit to the lower winding of relay 235, causing relay 235 to operate and prepare the vertical pulsing circuit of the test distributor at armature 236. The operation of relay 235 also causes relay 230 to operate from ground, armatures 227, 237, winding of relay 230 to battery. At armature 232, relay 230 switches the lower winding of relay 235 to ground through the resting contact of off-normal spring set 234, thus locking relay 235 to the off-normal spring set 234.

The tester then turns the dial (not shown) preliminary to dialing, thus removing ground potential from the sleeve conductors of plug P and jack J and causing relay 405 to restore. At armatures 407 and 408, relay 405 switches the tester's position testing circuit (partly shown) from the test leads of the test distributor to the operate leads, thereby holding the test distributor by means of the dial pulsing loop (not shown) over operate-conductors 431 and 432. At armature 406, relay 405 disconnects the right-handing winding of relay 415 from the operate leads, thereby clearing the operate circuit for pulsing. The dialing of the first digit of the test distributor causes vertical magnet 260 to correspondingly raise the shaft and wipers of the test distributor in the well-known Strowger manner. The vertical pulsing circuit may be traced from ground, armature 222 and resting contact, armature 226 and working contact, armature 236 and working contact, upper winding of relay 235 and winding of vertical magnet 260 in multiple to battery. The off-normal spring set 234 operates with the first vertical step thereby opening the locking circuit to the lower winding of relay 235 and placing the release of relay 235 under the control of the vertical pulsing circuit. The operation of off-normal spring set 234 also completes an obvious locking circuit to relay 230 to retain relay 230 operated until after the test distributor has been released.

Shortly after the last vertical pulse has been received, relay 235 restores to normal position and switches the pulsing circuit to rotary magnet 265 and relay 240 in multiple. The cessation of the vertical pulses re-establishes ground potential on the sleeve conductors of plug P and jack J with the result that relay 405 re-operates and switches the right-hand winding of relay 415 across the operate leads to hold test distributor Fig. 2 operated.

The dialing of the second digit of the test distributor causes rotary magnet 265 to rotate the test distributor wipers across the selected bank level to the desired test connector bank contact in the well-known Strowger manner, and also causes relay 240 to operate and hold during the rotary pulsing. The rotary pulsing circuit may be traced from ground, armature 222 and resting contact, armature 226 and working contact, armature 236 and resting contact, armature 252, winding of relay 240 to battery, and also through armature 257, winding of rotary magnet 265 to battery. The operation of relay 240 causes relay 245 to operate from ground, armatures 229, 254, armature 242 and working contact, winding of relay 245 to battery. Relay 240 is of the slow-to-release type and, therefore, will remain operated for a short interval after the rotary pulsing circuit is opened at armature 222. As in the case of dialing the first test distributor digit, when the tester turns the dial preliminary to dialing, ground potential is removed from the sleeve conductors of plug P and jack J causing relay 405 to restore and switch the tester's position testing circuit from the test leads of the test distributor to the operate leads. The cessation of the rotary pulses re-establishes ground potential on the sleeve conductors of plug P and jack J with the result that relay 405 re-operates and switches the right-hand winding of relay 415 across the operate leads to hold the test distributor operated.

Should the dialed test connector be in prior use, then wiper 203 of the test distributor encounters ground potential on conductor 273 thereby completing a locking circuit for relay 245 by way of armature 259 and resting contact, armature 249 and working contact, winding of relay 250, resting contact of armature 242 (relay 240 now having restored), winding of relay 245 and battery. At armatures 246 and 247, relay 245 opens the line test-leads to the dialed test connector. Relay 250 operates in series with relay 245 and, at armature 251, connects busy tone through condenser 239 to the tester's position test circuit to inform the tester that the dialed test connector is in prior use. At armature 253, relay 250 completes an obvious circuit to relay 210, causing relay 210 to operate and reverse the battery and ground connections to operate-leads 431 and 432 thereby reversing the current flow through the right-hand winding of relay 415 and thus causing relay 415 to operate. At armature 416 and working contact, relay 415 connects interupted ground potential to busy lamp 411 to indicate to the tester that the dialed test connector is in prior use.

Assuming now that the dialed test connector is not in prior use, then wiper 203 does not encounter ground potential on conductor 273 of the selected test connector and, consequently, relay 245 cannot lock up but restores shortly after relay 240 restores. Before relay 245 restores, however, a circuit is completed from ground, armature 229, armature 254, armature 242 and resting contact, armature 243, winding of relay 255 to battery, causing relay 255 to operate and lock to ground through armatures 244 and 229. At armature 257, relay 255 opens the rotary magnet circuit to prevent possible further rotary stepping: at armature 259 and working contact, connects direct ground through wiper 203 to conductor 273 of the selected test connector to busy the selected test connector against intrusion; and, at armature 256, completes a loop circuit for relay 305 of the selected test connector through armature 221 thereby causing relay 305 to operate. At armature 306 and working contact, relay 305 completes a circuit to relay 310, causing relay 310 to operate. At armature 312 and working contact, relay 310 completes a circuit to relay 335 through armature 317, causing relay 335 to operate.

The dialing of the first digit of the test connector causes relay 220 of the test distributor to correspondingly interrupt the loop circuit of relay 305 of the test connector at armature 221. The interruptions of the loop circuit of relay 305 cause relay 305 to correspondingly complete the pulsing circuit to vertical magnet 360 and relay 320, thereby causing vertical magnet 360 to correspondingly raise the shaft and associated wipers of the test connector in the well-known Strowger manner, and relay 320 to operate and hold during the vertical pulsing. The vertical pulsing circuit of the test connector may be traced from ground, armature 306 and resting contact, armature 311 and working contact, winding of relay 320 to battery, and through armature 331 and resting contact, armature 336 and working contact, winding of vertical magnet 360 to battery. The operation of relay 320 causes relay 325 to operate over an obvious circuit. At armature 327, relay 325 opens a point in the circuit of the upper winding of relay 330 to prevent the operation of relay 330 in series with relay 335; and, at armature 326, short-circuits the upper winding of relay 320 to make relay 320 slow in releasing when the circuit of relay 320 is opened. At armature 327 and working contact, relay 325 completes a locking circuit for relay 335 by way of armature 337, armature 332 and resting contact. The off-normal spring set 313 operates with the first vertical pulse thereby causing relay 315 to operate and perform certain preparatory functions.

Shortly after the last vertical pulse has been received, relays 320 and 325 restore. At the resting contact of armature 327, relay 325 completes a circuit through the upper winding of relay 330 from ground, armature 312 and working contact, resting contact of armature 327, upper winding of relay 330, armature 337, winding of relay 335 to battery, causing relay 330 to operate and relay 335 to remain operated.

The dialing of the second digit of the test connector causes relay 220 of the test distributor to correspondingly interrupt the loop circuit of relay 305 of the test connector at armature 221. The interruptions of the loop circuit of relay 305 cause relay 305 to correspondingly complete the pulsing circuit to rotary magnet 365 and relay 320, thereby causing rotary magnet 365 to rotate the test connector wipers across the selected bank level to the desired line circuit bank contact in the well-known Strowger manner, and also cause relay 320 to operate and hold during the rotary pulsing. The rotary pulsing circuit of the test connector may be traced from ground, armature 306 and resting contact, armature 311 and working contact, winding of relay 320 to battery, and through armature 331 and working contact, winding of rotary magnet 365 to battery. At armature 321 and working contact, relay 320 causes relay 325 to operate. At armature 327 and working contact, relay 325 completes a holding circuit for relay 330 from ground, armature 312 and working contact, armature 327 and working contact, armature 332 and working contact, lower winding of relay 330 to battery: at the resting contact of armature 327, opens the circuit to the upper winding of relay 330; and, at armature 326, short circuits the upper winding of relay 320 to make relay 320 slow in releasing when the circuit of relay 320 is opened. The opening of the circuit of the upper winding of relay 330 also opens the locking circuit of relay 335, causing relay 335 to restore. The circuits to wipers 301, 302, 303, 307, 308 and 309 of the test connector are open at the banks of the minor switch wipers 351, 352 and 353 as wipers 301, 302, 303, 307, 308 and 309 are passing over line circuit bank contacts in response to the dialing of the second digit of the test connector, thereby preventing interference with line circuits during rotation.

Shortly after the last rotary pulse has been received, relays 320 and 325 restore. At armature 327, relay 325 opens the locking circuit to the lower winding of relay 330, causing relay 330 to restore. The dialing of the third digit of the test connector causes relay 220 of the test distributor to correspondingly interrupt the loop circuit of relay 305 of the test connector at armature 221. The interruptions of the loop circuit of relay 305 cause relay 305 to correspondingly complete the pulsing circuit to step magnet 350 of the minor switch and relay 320, thereby causing step magnet 350 to rotate the minor switch wipers 351, 352 and 353, and also causing relay 320 to operate and hold during the pulsing of the third digit. The pulsing circuit of the third digit of the test connector may be traced from ground, armature 306 and resting contact, armature 311 and working contact, winding of relay 320 to battery, and through armatures 331, 336, 341 and associated resting contacts, winding of step magnet 350 to battery. At armature 321 and working contact, relay 320 causes relay 325 to operate. At armature 326, relay 325 short-circuits the upper winding of relay 320 to make relay 320 slow in releasing when the circuit to relay 320 is opened.

The operation of step magnet 350 of the minor switch causes wipers 351, 352 and 353 to be moved across the associated sets of bank contacts. If the third digit of the test connector consists of five pulses or less, wiper 351 will test in the first 100-group of line circuits, and if the third digit consists of six or more pulses, wiper 351 will test in the second 100-group of line circuits. As the minor switch wipers 351, 352 and 353 step off-normal, the minor switch off-normal spring set 356 operates to prepare other circuits for the switch. The line test leads to wipers 301, 302, 307 and 308 are open at contacts 246 and 247 of the test distributor during the dialing of the third digit of the test connector because relay 245 operates with the first pulse of the third digit and remains operated for the period of the pulsing of the third digit.

Shortly after the last pulse of the third digit has been received, relays 320, 325 and 245 restore. Should the dialed line circuit be in prior use, then ground potential will be returned over either wiper 303 or wiper 309, dependent upon whether the dialed line circuit is in the first 100-group or the second 100-group, by way of wiper 351, conductor 274, bank contact connected to conductor 274 in Fig. 2, wiper 204, armature 258, armature 248 and working contact (before relay 245 has had sufficient time to restore after the dialing of the third digit), armature 241, winding of relay 210 to battery, causing relay 210 to operate and lock to ground by way of armature 258, resting contact of armature 248 (relay 245 now having restored), and armature 213 and working contact. At armatures 211 and 212, relay 210 reverses the battery and ground connections to operate-leads 431 and 432 thereby reversing the current flow through the right-hand winding of relay 415 and thus causing relay 415 to operate. At armature 416 and working contact, relay 415 connects interrupted ground potential to busy lamp 411 to indicate to the tester that the dialed line circuit is in prior use.

Assuming now that the dialed line circuit is not in prior use, then ground potential is not returned to conductor 274 in Fig. 2 and, consequently, relay 210 cannot operate and reverse the current flow through the right-hand winding of relay 415. Instead, a circuit is completed for relay 340 of the test connector from ground, armature 321 and resting contact, contact 357 of minor switch spring set 356, armature 318 and working contact, winding of relay 340 to battery, causing relay 340 to operate and lock to ground by way of armature 342 and conductor 273. At armature 341, relay opens the pulsing circuit to step magnet 350 of the minor switch: at armature 341 and working contact, prepares a pulsing circuit to rotary magnet 365 to enable the tester to later advance the test connector wipers to another line circuit by dialing another digit, or digits; and, at armature 343, opens a point in the release circuit of the minor switch. As previously indicated, relay 245 in the test distributor restores shortly after the third digit of the test connector has been dialed, and ground potential is extended to either wiper 303 or 309 (as the case may be) of the test connector by way of armature 216, armature 213 and resting contact, resting contact of armature 248, armature 258, wiper 204, conductor 274 to Fig. 3, wiper 351 and selected bank contact of the minor switch. The ground potential on wiper 303 or 309 causes the cut-off relay (not shown) of the selected line circuit (not shown) to operate, and also guards the selected line circuit against intrusion. The tester's position testing circuit is now connected through to the selected line circuit over test conductors 267 and 268, and any or all of well-known tests can be applied to the selected line circuit. Since such tests form no part of the present invention, the details will not be included in this specification other than to indicate that by operating key 417 (Fig. 4), the tester may remove ground potential from the cut-off relay (not shown) of the selected line circuit thereby placing the line relay (not shown) of the selected line circuit across the line test leads 267 and 268 and operating the line relay (not shown) to seize a trunk circuit accessible to the selected line circuit. Operating key 417 causes relay 410 to operate and connect ground potential to negative operate conductor 431, thereby shunting relay 215 in the test distributor and causing relay 215 to restore. At armature 216, relay 215 removes ground potential from conductor 274 of the test connector thereby causing the cut-off relay (not shown) of the selected line to restore.

At the conclusion of the tests, the tester releases the test distributor, test connector and selected line circuit by withdrawing plug P from jack J and operating key 418. The removal of plug P opens contact 414 but relay 420 cannot restore because its circuit is maintained through armature 423 and the winding of relay 425. The opening of contact 414 also removes the ground shunt from the winding of relay 425, and relay 425 immediately operates to complete a multiple circuit through the right-hand winding of relay 415 at armature 427. The removal of plug P also opens the circuit to relay 405 causing relay 405 to restore and, at armature 406, open the original circuit through the right-hand winding of relay 415 but the multiple circuit through armature 427 retains a circuit through the right-hand winding of relay 415. The operation of key 418 shunts down both relays 420 and 425 and the holding circuit to the test distributor operate-leads 431 and 432 is now open at armatures 422 and 427.

Should the test distributor release first by the opening of the holding circuit at armatures 422 and 427, the test connector is guarded by ground potential through armature 319. Should the test connector release first by the opening of its holding circuit at armature 221, the test connector trunk is busied from ground through armature 259 and wiper 203. The release circuit of the test distributor is completed from ground, armature 222 and resting contact, armature 226 and resting contact, armature 231, winding of release magnet 270 to battery, and magnet 270 causes the release of the shaft and wipers in the well-known Strowger manner. As the shaft reaches its normal position, off-normal spring set 234 is operated to unlock relay 230, thereby opening the circuit of release magnet 270 at armature 231. The restoration of relay 225 opens the locking circuit to relay 255 at armature 229, and the restoration of relay 255 removes ground potential from wiper 203 at armature 259 and ground potential from wiper 204 at armature 258.

Two release circuits are employed in the test connector (Fig. 3), ones for causing the restoration of the test connector switch shaft and associated wipers, and the other for causing the restoration of the minor switch and associated wipers 351, 352 and 353. The release circuit for the shaft and wiper 301, 302, 303, 307, 308 and 309 is completed from ground, armature 306 and resting contact, armature 311 and resting contact, armature 316, winding of release magnet 370 to battery, and magnet 370 causes the release of the shaft and associated wipers in the well-known Strowger manner. As the shaft reaches its normal position, off-normal spring set 313 is operated to unlock relay 315, thereby opening the circuit of the release magnet 370 at armature 316. The removal of multiple ground potential from conductor 273 at armatures 319 and 259 opens the locking circuit of relay 340. The release circuit for the minor switch and associated wipers 351, 352 and 353 is completed from ground, armature 321 and resting contact, contact 357 of minor switch off-normal spring set 356, armature 318 and resting contact, armature 343, winding of minor switch release magnet 355 to battery, and the operation of release magnet 355 restores wipers 351, 352 and 353 to their normal positions. As wipers 351, 352 and 353 reach normal position, off-normal spring set 356 is restored to normal position thereby opening the circuit of release magnet 355 at contact 357. Should the shaft and associated wipers fail to restore when the circuit of release magnet 370 is completed, a circuit to a delayed alarm circuit (not shown) is completed from ground, armature 312 and resting contact and armature 314 and working contact. Should the minor switch and associated wipers 351, 352 and 353 fail to restore when the circuit of release magnet 355 is completed, a circuit to the delayed alarm circuit (not shown) is completed from ground, armature 312 and resting contact, armature 314 and resting contact and contact 358 of minor switch off-normal spring set 356.

After having selected a line circuit over test trunk 40, test distributor Fig. 2, and test connector Fig. 3, should the tester desrie to "hold" the selected line circuit for the time being and use his position testing circuit for another purpose in the meantime, he can do so by removing plug P from jack J of test trunk 40. The withdrawal of plug P causes contact 414 of jack J to open with the result that relay 420 is retained in the operated position through armature 423 and the winding of relay 425, and relay 425 immediately operates. At armature 427, relay 425 completes a multiple circuit through the right-hand winding of relay 415; and, at armature 426, completes the circuit of hold lamp 413. The withdrawal of plug P also causes relay 405 to restore and, at armature 406, open the original circuit through the right-hand winding of relay 415 but the multiple circuit through armature 427 retains a circuit through the right-hand winding of relay 415. The tester may later return to the held connection on test trunk 40 by re-inserting plug P into jack J in which event relay 405 re-operates and relay 425 is shunted down thus placing the test connection in the same condition as it was when set up originally. The tester may abandon the held connection on test trunk 40 without re-inserting plug P into jack J by operating key 418, thereby releasing the held connection in the manner previously explained.

After having selected a line circuit in one of the 100-groups of line circuits in the manner previously described, the tester can advance the used test connector to the next line circuit on the same bank level of the test connector by simply dialing a single pulse (digit "1") instead of first releasing the test connector and then dialing the 3-digit test connector number of the next line circuit. In the preceding explanation of a connection to an idle line circuit it was recorded that relay 340 of the used test connector is operated and locked as soon as the pulsing of the minor switch step magnet 350 had been completed, and that the operation of relay 340 transferred the pulsing circuit from minor switch step magnet 350 to rotary magnet 365 at armature 341. Now, as a consequence of sending a single pulse into the test connector switch, rotary magnet 365 steps wipers 301, 302, 303, 307, 308 and 309 to the next bank contacts of the same bank level. By successive single pulses, wipers 301, 302, 303, 307, 308 and 309 can be advanced to the successive bank contacts of the same bank level until the last set of bank contacts in the level are reached. In this manner, the tester can select and test all of the line circuits associated with the same bank level without releasing the used test connector.

Should the tester desire to select a line circuit in another bank level of the same 100-group of line circuits after having selected and tested a line circuit in a different bank level, he then operates key 412 momentarily, thus causing relay 430 to operate. At armature 428 and working contact, relay 430 connects battery through resistor 429 to operate-conductor 432, thereby shunting down relay 220 of the test distributor and retaining relay 215 in the operated position. At armature 217, relay 215 retains hold relay 225 operated to prevent the release of the test distributor. At armature 221, relay 220 opens the loop circuit to relay 305 of the used test connector, thereby causing the completion of the circuit to release magnet 370. The operation of release magnet 370 causes the restoration of the shaft and associated wipers in the well-known Strowger manner but in this instance relay 340 is retained in the locked position by means of the ground potential through armature 259 and wiper 203 of the held test distributor and conductor 273 of the test connector. As a consequence of relay 340 remaining locked, the circuit to release magnet 355 of the minor switch remains open at armature 343, and the minor switch is, therefore, not released. The tester next dials the first and second test connector digits of the desired line circuit, omitting the third digit since the minor switch wipers 351, 352 and 353 remained in the operated position as a result of the non-release of the minor switch. The test connector operates up and around responsive to the dialing of the first and second digits of the test connector in the manner previously explained, and the tester's position testing circuit is extended over line test-leads 267 and 268 to the line circuit just selected.

Should the dialed test connector Fig. 3 be in prior use when the test distributor Fig. 2 attempts to seize that test connector, busy lamp 411 of test trunk 40 is caused to flash in the manner previously explained to inform the tester that the dialed test connector is in prior use. The tester can then either abandon the connection by withdrawing plug P from jack J and operating key 418 to effect a complete release, or leave the connection remain as it is with busy lamp 411 continuing to flash. In the latter instance, busy lamp 411 will continue to flash as long as the test connector remains in prior use, and when the test connector is later released from the prior connection, busy lamp 411 will cease to flash and will illuminate with a steady glow to indicate to the tester that the wanted test connector is now available and has been seized. The manner in which this seizure takes place is described in the following paragraph.

Ground potential on conductor 273 of the busy test connector caused relays 245 and 250 in the test distributor to be operated and locked as previously explained, with the consequent operation of relay 210 to reverse the battery and ground connections to the right-hand winding of relay 415 of trunk 40. When the busy test connector is released from the prior connection, ground potential is removed from conductor 273 thereby opening the locking circuit of relays 245 and 250 and causing their restoration. Relay 245, however, is of the slow-to-release type and relay 250, therefore, restores slightly before relay 245. At armature 254, relay 250 completes a circuit to relay 255 from ground, armatures 229, 254, armature 242 and resting contact, armature 243, winding of relay 255 to battery, causing relay 255 to operate and lock to ground through armatures 244 and 229. At armature 259 and working contact, relay 255 connects direct ground through wiper 203 to conductor 273 of the freed test connector to busy the test connector against intrusion; and, at armature 256, completes a loop circuit for relay 305 of the test connector through armature 221 thereby causing relay 305 to operate. The restoration of relay 250 also opened the circuit of relay 210 at armature 253, causing relay 210 to restore and reverse the battery and ground connections of the right-hand winding of relay 415 to the normal arrangement thereby causing relay 415 to restore and disconnect interrupted ground from busy lamp 411 at armature 416. Busy lamp 411 then glows with a continuous glow to indicate to the tester that the wanted test connector has been freed from the prior connection and seized for his use.

In the event that the dialed test connector Fig. 3 is in prior use when the test distributor Fig. 2 attempts to seize that test connector, and the tester desires to use his position testing circuit for another purpose while waiting for the busy test connector to be freed and then seized by the test distributor associated with test trunk 40, he withdraws plug P from jack J but does not operate key 418. The removal of plug P from jack J opens contact 414 but relay 420 cannot restore because its circuit is maintained through armature 423 and the winding of relay 425. The opening of contact 414 also removes the ground shunt from the winding of relay 425 and relay 425 immediately operates to hold the connection on test trunk 40 in the manner previously explained. In addition, relay 425 at armature 426 completes a circuit to hold lamp 413, and the steady glowing of hold lamp 413 together with the flashing of busy lamp 411 indicates to the tester that he is holding an incomplete connection on test trunk 40 without plug P being in jack J. When the busy test connector is freed from its previous connection and then is seized by the test distributor associated with test trunk 40, the changing of the glowing of busy lamp 411 from a flashing glow to a continuous glow so informs the tester. He then re-inserts plug P into jack J to take over the connection and operate the seized test connector. The re-insertion of plug P into jack J closes contact 414 thereby shunting down relay 425. At armature 426, relay 425 opens the circuit of hold lamp 413; and, at armature 427, opens the multiple circuit through the right-hand winding of relay 415 thereby shifting the holding circuit of operate-leads 431 and 432 to armatures 406 and 422.

Should a dialed line circuit be in prior use when the test connector Fig. 3 attempts to seize that dialed line circuit, then busy lamp 411 of test trunk 40 is caused to flash in the manner previously explained to inform the tester that the dialed line circuit is in prior use. The tester can then either abandon the connection by withdrawing plug P from jack J and operating key 418 to effect a complete release, or leave the connection remain as it is with busy lamp 411 continuing to flash. In the latter instances, busy lamp 411 will continue to flash as long as the dialed line circuit remains in prior use, and when the dialed line circuit is later released from the prior connection, busy lamp 411 will cease to flash and will illuminate with a steady glow to indicate to the tester that the dialed line circuit is now available and has been seized. The manner in which the freed line circuit is seized is described in the following paragraph.

Ground potential is returned over either wiper 303 or 309 by way of wiper 351, conductor 274, bank contact connected to conductor 274 in Fig. 2, wiper 204, armature 258, resting contact of armature 248, and armature 213 and working contact to retain relay 210 in the operated position as previously explained. When the dialed line circuit is freed from the prior connection, ground potential is removed from conductor 274 thereby opening the locking circuit of relay 210 and causing its restoration. The restoration of relay 210 causes the reversal of the battery and ground connections of the right-hand winding of relay 415 to the normal arrangement. Relay 415, therefore, restores and disconnects interrupted ground from busy lamp 411 at armature 416, thereby causing busy lamp 411 to glow with a continuous glow to indicate to the tester that the dialed line circuit has been freed from the prior connection and seized for his use.

Test distributor switch Fig. 2 is fitted with a novel combined test jack and busy switch 224 which permits the busying of the test distributor while it is in use, without interfering with subsequent operation and release of the test distributor. Inserting a test plug into combined test jack and busy switch 224 while the test distributor is in prior use causes ground potential to be connected to conductor 433 thereby to maintain the circuit of busy lamp 411 of test trunk 40, and also causes the opening of contact 214 thereby to open the battery searching circuit from test distributor selector Fig. 1 to the lower winding of relay 235 of test distributor Fig. 2. The insertion of the test plug into combined test jack and busy switch 224 affects no other circuit of the test distributor. When the test distributor is ultimately released from its prior connection, the plugged up combined test jack and busy switch 224 will prevent seizure of the test distributor over test trunk 40 and also over test distributor selector Fig. 1.

*Verifying from main office operator switchboard to main office lines*

Assuming that the operator-controlled switchboard 10 shown in Fig. 1 is located in the same office (main office) as the test switchboard equipped with test trunk 40 (Fig. 4), then the operators at switchboard 10 use the test distributor Fig. 2 and test connector Fig. 3 switch train for verifying main office subscribers' line numbers in connection with completing calls (usually toll calls) for main office subscribers.

In the embodiment shown in Fig. 1, the operator switchboard 10 is connected by means of 3 conductor trunks, such as 147, 148 and 149, to test distributor selectors the wipers of which have access to the "—," "+" and "C" bank contacts connected to test distributors such as Fig. 2 by means of conductors such as 107, 108 and 109. The test distributor Fig. 2 is also connected to test trunk 40 of the test switchboard by means of conductors 431, 432, 433, 434 and 435.

An operator at switchboard 10 wishing to verify a main office subscriber's line number selects in any well-known manner the test distributor selector trunk comprising conductors 147, 148 and 149. A direct-current loop circuit (not shown) in the operator's position circuit (not shown) connected to the resting contacts of armatures 16 and 17 completes a battery and ground loop through the windings of relay 130 by way of the resting contacts of armatures 121 and 122, causing relay 130 to operate. The seizing of the test distributor selector trunk by the operator also causes relay 145 in the selector to operate from ground potential over conductor 149. At armature 131 and working contact, relay 130 completes an obvious circuit to relay 135, causing 135 to operate.

The operator then turns the dial preliminary to dialing, thus connecting ground potential from contact 11 of the dial to the winding of relay 15 thereby causing relay 15 to transfer the holding circuit of relay 130 to the pulsing springs of the dial at armatures 16 and 17 and associated working contacts. Contact 11 of the dial remains closed while the dialing of the digit is progressing. Relay 130 responds to the dialing of the test distributor selector digit, correspondingly completing the pulsing circuit to vertical magnet 160 and the lower winding of relay 145 in multiple, and vertical magnet 160 correspondingly raises the shaft and wipers of the test distributor selector in the well-known Strowger manner to the bank level to contacts of which the 107, 108 and 109 conductors of test distributor Fig. 2 are connected. The pulsing circuit of the test distributor selector may be traced from ground, armature 115, armature 131 and resting contact, armature 136 and working contact, armature 124, vertical magnet 160 and the lower winding of relay 145 in multiple to battery. The off-normal spring set 139 operates with the first vertical pulse thereby causing relay 140 to operate. At armature 141, relay 140 opens the circuit to the upper winding of relay 145 thereby placing the release of relay 145 under the control of the vertical pulsing circuit. The cessation of the vertical pulses causes relay 15 to restore and switch the holding circuit of relay 130 to the direct-current loop circuit (not shown) connected to the resting contacts of armatures 16 and 17.

Shortly after the last vertical pulse has been received, relay 145 restores to normal and completes a circuit to rotary magnet 165 from ground, armatures 138, 126, armature 106 and resting contact, armature 116, interrupter armature 166, armatures 143, 144, winding of rotary magnet 165 to battery, causing rotary magnet 165 to operate. The operation of rotary magnet 165 rotates the test distributor selector wipers onto the first bank contact set of the selected bank level in the well-known Strowger manner, and also opens its own circuit at interrupter armature 166. Wiper 103 tests the first C bank contact for a possible busy condition. Should the test distributor connected to the first bank contact set of the selected bank level be in prior use, then the restoration of rotary magnet 165 completes its own circuit at interrupter armature 166 and rotary magnet 165 again operates to rotate wipers 101, 102 and 103 to the next bank contact set. Should all of the bank contact sets of the selected bank level test busy, then wipers 101, 102 and 103 are rotated off of the bank level and cam spring set 119 is operated.

The operation of cam spring set 119 completes an obvious circuit to relay 120, causing relay 120 to operate. At armature 124, relay 120 opens the vertical pulsing circuit: at armature 126 opens the rotary pulsing pulsing circuit: at armature 123, connects busy tone through condenser 118 to the operator's transmission circuit; and, at armatures 121 and 122, reverses the battery and ground connections to conductors 147 and 148 to provide busy supervision at operator switchboard 10.

Assuming now that the test distributor selector finds an idle test distributor without wipers 101, 102 and 103 being rotated off of the selected bank level, then wiper 103 connects with battery through the lower winding of relay 235 (Fig. 2) and completes a circuit for relay 105 (Fig. 1) from ground, armatures 137, 125, winding of relay 105, wiper 103, C bank contact connected to conductor 109, contact 214 of test jack and busy switch 224, resting contact of armature 232, lower winding of relay 235 to battery, causing relays 105 and 235 to operate. At armature 106 and working contact, relay 105 completes a circuit to relay 110 from ground, armatures 138, 126, armature 106 and working contact, winding of relay 110 to battery, causing relay 110 to operate and lock to ground on conductor 149 through armature 114. At armatures 111, 112 and 113, relay 110 switches conductors 147, 148 and 149 through to wipers 101, 102 and 103 respectively, and thus connects the operator circuit to the selected test distributor Fig. 2. The operation of relay 235 completes an obvious circuit to relay 230 at armature 237, causing relay 230 to operate and connect ground to conductor 433 at armature 233 for the purpose of completing the circuit of busy lamp 411 of test trunk 40 on the main office test switchboard. The operation of armature 113 connects a ground shunt across relay 105, causing relay 105 to restore. The operation of armatures 111 and 112 opens the loop circuit of relay 130, causing relay 130 to restore. The circuit of relay 135 is now open at armatures 115 and 131, and shortly thereafter relay 135 restores.

The operator at switchboard 10 now controls the selected test distributor to select the desired test connector Fig. 3. The operation of the test distributor from switchboard 10 is the same as that described for the test distributor in the section titled "Testing from main office test switchboard to main office lines" with one addition. It will be noted that the upper winding of relay 205 is in series with operate-conductor 107 and the winding of relay 220 and, therefore, relay 205 operates when the test distributor is seized from switchboard 10 and locks through its lower winding and armature 209 to ground on conductor 109. At armature 208, relay 205 short-circuits its upper winding to remove that winding from the transmission circuit; and, at armatures 206 and 207, connects the line test-leads 434 and 435 to conductors 107 and 108 through condensers 218 and 219 respectively thereby to provide a line listening, or verification, circuit. In all other respects, the operation of the test distributor from switchboard 10 is the same as that described in the section titled "Testing from main office test switchboard to main office lines."

The operator at switchboard 10 next controls the selected test connector to select the main office line circuit the number of which the operator wishes to verify. The operation of the test connector from switchboard 10 in selecting the desired line circuit is the same as that described for the test connector in the section titled "Testing from main office test switchboard to main office lines." The operator's listening circuit through condensers 218 and 219 of the test distributor is extended over test-leads 267 and 268 of the test connector to the selected line circuit, and the operator, therefore, can verify the line circuit connection.

When the operator has completed the verification, she disconnects the position circuit (not shown) from conductors 147, 148 and 149 of the test distributor selector trunk, and the disconnection of the direct-current loop from conductors 147 and 148 causes test distributor Fig. 2 and test connector Fig. 3 to release in the manner explained in the section titled "Testing from main office test switchboard to main office lines." The removal of ground potential from conductor 149 at operator switchboard 10 does not unlock relay 110 (Fig. 1) immediately because ground potential is returned over conductor 109 to maintain the locking circuit of relay 110 until slow-to-release relay 225 (Fig. 2) has had sufficient time to restore. The ultimate removal of all ground potentials from conductor 149 cause relay 110 in the test distributor selector to restore. At armature 115, relay 110 completes the circuit to release magnet 170 from ground, armature 115, armature 131 and resting contact, armature 136 and resting contact, armature 142, winding of release magnet 170 to battery. Release magnet 170 causes the release of the shaft and wipers in the well-known Strowger manner and, as the shaft reaches its normal position, off-normal spring set 139 is operated to restore relay 140, thereby opening the circuit of release magnet 170 at armature 142.

It should be understood at this time that test distributor selectors such as shown in Fig. 1 need not be employed between test distributors Fig. 2 and the operator switchboard 10, as the test distributors can be connected directly to operator switchboard 10. In the latter event, conductor 107 of the test distributor Fig. 2 would be connected directly to conductor 147 from operator switchboard 10 and conductor 108 to conductor 148, conductors 109 and 149 being eliminated as unnecessary. In operating directly with the test distributor, the operator would omit the digit otherwise required for operating the test distributor selector switch.

*Testing from main office test switchboard to branch office lines*

Test trunk 400 is provided on the main office test switchboard in order that a main office tester can test line circuits terminating in a branch office over a test distributor-test connector switch train located in that branch office. In order that the operators at main office switchboard 10 can also use the same test switch train in the branch office for verifying branch office subscribers' line numbers, trunk relay group 470 is provided in main office, and conductors 471, 472, 473, 474, 475 of test trunk 400 and conductors 127, 128, 129 from the test distributor selector banks (Fig. 1) are connected to trunk relay group 470 as shown in Fig. 4. Trunk relay group 470 is connected to the branch office by means of conductors 456, 457, 458 and 459 of trunk 455. The test switch train in the branch office comprises test distributor 445 and test connectors such as test connector 460.

Test distributor 445 is shown primarily in block form but would be of the same circuit design and operation as test distributor Fig. 2 (previously described) with the exception that relay 205, condensers 218, 219, and related wiring are not required. Wipers 401, 402, 403, 404, 461 and 462 of test distributor 445 correspond respectively to wipers 201, 202, 203, 204, 261 and 262 of test distributor Fig. 2. Test distributor Fig. 2 with the exception just noted may, therefore, be substituted for test distributor 445 when tracing the detail operations.

Test connector 460 is shown primarily in block form but would be of the same circuit design and operation as test connector Fig. 3 (previously described), and wipers 441, 442, 443, 437, 438, 439 of test connector 460 correspond respectively to wipers 301, 302, 303, 307, 308 and 309 of test connector Fig. 3. Test connector Fig. 3 may, therefore, be substituted for test connector 460 when tracing the detail operations.

Test trunk 400 is shown in block form but would be of the same circuit design and operation as test trunk 40 (previously described), conductors 471, 472, 473, 474 and 475 corresponding respectively to conductors 431, 432, 433, 434 and 435. Test trunk 40 may, therefore, be substituted for test trunk 400 when tracing the detail operations.

The tester at the main office test switchboard upon noting that the busy lamp (not shown but is similar to busy lamp 411 of test trunk 40) of test trunk 400 is dark, thus indicating that test distributor 445 in the branch office is not in prior use, inserts plug P of his position testing circuit into the jack (not shown) of test trunk 400. A direct-current loop is thereby connected across operate-conductors 471 and 472 in a manner previously explained for test trunk 40, and ground potential supplied over conductor 473 causes relay 480 in trunk relay group 470 to operate. At armature 482, relay 480 disconnects relay 485 from conductor 129 thereby to prevent test distributor selector Fig. 1 from seizing trunk relay group 470; and, at armature 481 and working contact, extends conductor 474 to conductor 494 by way of armatures 486 and 449. The completion of the loop across operate-conductors 471 and 472 causes test distributor 445 in the branch office to be seized in a manner similar to that explained for test trunk 40. Ground is returned over conductor 493 from test distributor 445 to complete the busy lamp circuit (not shown) of test trunk 440 on the branch office test switchboard. From this point on, the operation of test distributor 445 and test connector 460 over test trunk 400 on the main office test switchboard is the same as that described for test distributor Fig. 2 and test connector Fig. 3 in the section titled "Testing from main office test switchboard to main office lines."

*Verifying from main office operator switchboard to branch office lines*

An operator at main office switchboard 10 wishing to verify a branch office subscriber's line number selects in any well-known manner the test distributor selector trunk comprising conductors 147, 148 and 149. A direct-current loop circuit (not shown) in the operator's position circuit (not shown) connected to the resting contacts of armatures 16 and 17 completes a battery and ground loop through the windings of relay 130 by way of the resting contacts of armatures 121 and 122, causing relay 130 to operate. From this point on, the operation of test distributor selector Fig. 1 from operator switchboard 10 to seize trunk relay group 470 is the same as described for the seizing of test distributor Fig. 2 in the section titled "Verifying from main office operator switchboard to main office lines."

Assuming now that trunk relay group 470 is not in prior use and that test distributor selector wipers 101, 102 and 103 have stopped on bank contacts —′, +′ and C′ connected to trunk relay group 470 by means of conductors 127, 128 and 129, then a circuit is completed for relay 105 (Fig. 1) and relay 485 (Fig. 4) from ground, armatures 137, 125, winding of relay 105, wiper 103, C′ bank contact connected to conductor 129, armatures 467, 482, winding of relay 485 to battery, causing relays 105 and 485 to operate. Relay 485 locks to conductor 129 through armature 489 independent of armatures 467 and 482. At armature 106 and working contact, relay 105 completes a circuit to relay 110 from ground, armatures 138, 126, armature 106 and working contact, winding of relay 110 to battery, causing relay 110 to operate and lock to ground on conductor 149 through armature 114. At armatures 111, 112 and 113, relay 110 switches conductors 147, 148 and 149 through to wipers 101, 102 and 103 respectively, and thus connects the operator circuit to trunk relay group 470. At armature 487, relay 485 causes relay 465 to operate and complete the busy lamp circuit (not shown) of test trunk 400 on the main office test switchboard. At armature 486 and working contact and at armature 488, relay 485 connects line test-leads 494 and 495 through condensers 483 and 484 to operate-leads 127 and 128 respectively thereby to provide a line listening, or verifying, circuit to the branch office test distributor 445.

The operator at switchboard 10 next controls the selected test distributor 445 in the branch office to select test connector 460, and then controls test connector 460 to select the branch office line circuit the number of which the operator wishes to verify. The operation of test distributor 440 and test connector 460 from operator switchboard 10 for selecting the desired line circuit in the branch office is the same as the equivalent operation of the test distributor and test connector in the section titled "Testing from main office test switchboard to main office lines." The operator's listening circuit through condensers 483 and 484 of trunk relay group 470 is extended over test-leads 494 and 495 through test distributor 440 and test connector 460 to the selected line circuit in the branch office, and the operator, therefore, can challenge the line circuit for verification. Ground is returned over conductors 493 from test distributor 445 to complete the busy lamp circuit (not shown) of test trunk 440 on the branch office test switchboard.

The release of the branch office verification connection is accomplished in a similar manner to the equivalent release outlined in the section titled "Verifying from main office operator switchboard to main office lines."

*Testing from branch office test switchboard to branch office lines*

Test trunk 440 on the branch office test switchboard is shown mostly in block form but would be of the same circuit design and operation as test trunk 40 (previously described) with the exception that while relay 450 corresponds to relay 420 of test trunk 40, relay 450 is equipped with two additional armatures 448 and 449. When relay 450 is operated responsive to the tester at the branch office test switchboard inserting the plug of his position testing circuit (not shown) into the jack (not shown) of test trunk 440, armatures 448 and 449 disconnect the line test-leads from the main office test switchboard and, at armature 449 and working contact, a circuit is completed to relay 465 of trunk relay group 470 to cause the operation of relay 465. At armature 466 and working contact, relay 465 completes a circuit to the busy lamp (not shown) of test trunk 400 on the main office test switchboard; and, at armature 467, disconnects conductor 129 from the winding of relay 485 thereby to prevent a seizure of trunk relay group 470 from operator switchboard 10. Conductors 491, 492, 493, 494 and 495 of test trunk 440 correspond respectively to conductors 431, 432, 433, 434 and 435 of test trunk 40. In all other respects, the operation of test trunk 440 would be the same as that described for test trunk 40 in the section titled "Testing from main office test switchboard to main office lines."

Having described the invention, what is considered new and is desired to have protected by Letters Patent is pointed out in the following claims:

1. In a telephone system, a switch having a shaft and shaft moving means, a pulsing circuit, a relay having two windings, an incomplete circuit connected to each of said windings, means for seizing said switch, means responsive to said switch being seized for completing the circuit of one of said windings thereby to operate said relay, a second relay, a contact set, means for causing said second relay to operate, said operation of said second relay transferring the control of said completed circuit of said one winding of said first relay to said contact set, means for operating said pulsing circuit to cause said moving means to correspondingly move said shaft, means responsive to said moving of said shaft for operating said contact set, said operation of said pulsing circuit also correspondingly completing and opening the circuit of said other winding of said first relay, said operation of said contact set opening the completed circuit of said one winding of said first relay to place said first relay under the control of only said pulsing circuit.

2. In a telephone system, a switch having two sets of wipers, a vertical movement, a horizontal movement, a progressively movable minor switch for selecting either of said sets of wipers, said sets of wipers having a common normal position, release means for releasing only said vertical and horizontal movements, a first circuit including means for operating said vertical movement to lift both said sets of wipers, a second circuit including means for operating said horizontal movement to rotate both said sets of wipers, a third circuit including means for thereafter operating said minor switch, said operation of said minor switch selecting one of said sets of wipers, means for retaining said operated minor switch in its operated position to maintain said selection of said one set of wipers, and a fourth circuit including means for operating said release means to release only said operated horizontal and vertical movements thereby to restore both said sets of wipers to said normal position.

3. The telephone system as claimed in claim 2 wherein said means of said first circuit and said means of said second circuit respectively reoperate said released vertical and horizontal movements to again lift and rotate both said restored sets of wipers.

4. In a telephone system, a switch having two sets of partially connected wipers, a vertical movement, a rotary movement, a progressively movable minor switch for completely connecting either of said sets of partially connected wipers, a first circuit including means for operating said vertical movement to raise said sets of partially connected wipers, a second circuit including means for operating said rotary movement to rotate said raised sets of partially connected wipers, a third circuit including means for operating said minor switch to completely connect only one of said rotated sets of partially connected wipers, means for retaining said operated minor switch in its operated position to maintain said connection of the completely connected rotated set of wipers, and a fourth circuit including means for thereafter further operating said operated rotary movement thereby to cause the completely connected rotated set of wipers to be correspondingly further rotated.

5. In a telephone system, a calling line, a first switch, a second switch including means whereby said second switch is accessible to said first switch, means for seizing said first switch over said calling line, means in said first switch when operated by said calling line for seizing said second switch, busy means in said first switch responsive to said seizure of said second switch for busying said second switch against other possible seizure, release means in said first switch for releasing only said second switch, means controlled by said calling line for causing said release means to release only said second switch, and means in said first switch controlled by said last mentioned means for maintaining said busy means effective to busy said second switch against other possible seizure during said release of said second switch.

6. The telephone system claimed in claim 5 wherein said means in said first switch controlled by said last mentioned means maintains said busy means effective to busy said second switch against other possible seizure during and after said release of said second switch.

7. In a telephone system, a line, a trunk, a first switch, a second switch including means whereby it is accessible to said first switch and to said trunk, means for seizing said first switch over said line, means for operating said first switch over said line to seize said second switch, means for operating said second switch over said line and said first switch, means whereby said line is abandoned, means for releasing both said operated switches responsive to abandonment by said line, a contact set in said first switch manually operated after said seizure of said second switch and before said second switch is released, means whereby when said contact set is operated, said second switch is busied against possible subsequent seizure over said line.

8. The telephone system claimed in claim 4 together with means for restoring the completely connected rotated set of wipers and the partially connected rotated set of wipers, and means for restoring said operated minor switch including means whereby the completely connected restored set of wipers is disabled.

9. The telephone system claimed in claim 7 together with means whereby when said contact set is operated, said second switch is also busied against possible seizure over said trunk.

CLARENCE E. LOMAX.

REFERENCES CITED

The following references are of record in the file of this patent:

UNITED STATES PATENTS

| Number | Name | Date |
|---|---|---|
| 1,640,675 | Schwartz | Aug. 20, 1927 |
| 1,691,269 | Crocker | Nov. 13, 1928 |
| 1,888,307 | Caswell | Nov. 22, 1932 |
| 1,907,240 | Brooks | May 2, 1933 |
| 2,091,116 | Griffins | Aug. 24, 1937 |
| 2,262,446 | Beale | Nov. 11, 1941 |
| 2,301,837 | Wiley | Nov. 10, 1942 |
| 2,327,458 | Relfe | Aug. 24, 1943 |
| 2,348,301 | Lomax | May 9, 1944 |
| 2,377,453 | Phonds | June 5, 1945 |